Patented May 19, 1942

2,283,821

UNITED STATES PATENT OFFICE 2,283,821

MOLDED LIGNOCELLULOSIC MATERIAL AND METHOD OF MAKING SAME

Arlie W. Schorger, Madison, Wis., and John H. Ferguson, Freeport, Ill., assignors to Burgess Cellulose Company, Freeport, Ill., a corporation of Delaware No Drawing. Application January 18, 1940, Serial No. 314,454

6 Claims. (Cl. 260—10)

This invention relates to a method for treating natural lignocelluloses by a simple cooking and washing operation to produce a product which upon drying may be hot-molded to produce a hard resinous material. The invention also relates to the products produced thereby.

It is an object of this invention to produce, by a simple and inexpensive process, a molding compound from natural lignocellulosic materials which may be hot-molded into a product possessing the desirable characteristics of products molded from the primary material itself or admixed with artificial resins and the like.

Briefly, the process consists in cooking a natural lignocellulosic material with water within a limited range of temperature and for a predetermined time to render water-soluble a part of the lignocellulosic material and particularly to dissolve the hemicelluloses. The residual product, after extraction of the water-solubles and subsequent drying, contains a large part of the original thermoplastic resinous lignin, and may be hot-molded under pressure but without the addition of a binder, into a hard resinous product having a high strength and a high resistance to the absorption of water.

The raw material for the process is any natural lignocellulosic material such as wood, corncobs, straw, bagasse, cornstalks, etc. When a natural lignocellulosic material is referred to herein it includes manufactured products such as newsprint containing, for example, 70%–90% of coniferous ground wood. The ground wood therein is substantially in its original or natural condition.

The lignocellulosic material, after being ground or otherwise comminuted, is cooked with water at an elevated temperature whereby part of the hemicelluloses are dissolved. The time and temperature used during the cooking operation may vary within limits of from approximately 5 minutes to 1 hour and 188° C. to 225° C., depending upon the specific properties desired in the final product. The cooking may be done in water to which has been added small amounts of chemicals that function as buffers whereby the pH of the cook is maintained within the range of 4 to 6, and preferably between 4.5 and 5.5. The presence of moisture in the molding compound during the molding operation affects appreciably the properties of the molded product.

The cooking temperature and the cooking time are closely related in so far as the strength of the molded product is concerned. The amount of moisture present and the hydrogen ion concentration during the molding operation also are factors. If the water absorption of the molded product is unimportant then cooking temperatures (one hour cooking time) of from 148° C. to 188° C. with hardwood sawdust give the best results. In a specific instance a one hour cook at 181° C. gave a product having its maximum strength when molded dry. When molded moist the maximum strength resulted when the hardwood sawdust was cooked at a temperature of 160° C. With the cooking time decreased to 15 minutes a cooking temperature of as high as 199° C. resulted in a molded product which had excellent strength, though the maximum strength resulted with the material cooked at from 170° C. to 193° C. This product which had been cooked 15 minutes when dry molded had substantially greater strength than that which was molded moist.

The water absorption and extent of flow of the molded product appear to be more closely related to the cooking temperature than does its strength. Tests indicate that the maximum resistance to moisture is developed when the cooking temperature, using hardwood sawdust as the lignocellulosic material, is about 193° C. to 198° C., regardless of whether the cooking time is 15 minutes or one hour, though these variables in themselves affect the water absorption. For example, the moisture resistance of a moist-molded product decreases rapidly as the cooking temperature is decreased below 170° C. with a cooking time of one hour. If the same material is dry-molded the water resistance is substantially less and decreases rapidly at cooking temperatures below 188° C. The same material cooked for 15 minutes and moist-molded has an excellent water resistance when cooked at temperatures above 188° C., but at temperatures somewhat below this disintegrates upon being immersed in water for several days. If dry-molded this product exhibits less water resistance but greater strength. Cooking at above 198° C. apparently affects the strength adversely but improves the water resistance, though each natural lignocellulosic material has its particular characteristics, and variations from the above data may be expected for the various natural raw materials.

During the cooking operation a part of the hemicelluloses and other constituents of the wood are dissolved. About 20% to 50% of the natural lignocelluloses are dissolved, about 30% being the average for wood. Corncobs lose about 50% in weight on cooking at 188° C. for one hour;

newsprint loses about 23% under the same conditions, and straw about 44%.

A small amount of buffers, or active chemicals producing buffers, is added during the cook to neutralize the acetic acid split off from the wood, thereby keeping the hydrogen ion concentration at the desired point, usually about 5.5. For example, 2½% of lime, Ca(OH)$_2$, may be added to the wood before cooking. This lime forms an excellent buffer, calcium acetate, with the liberated acetic acid. This is a cheap and convenient method of forming the buffer in situ. If more than enough alkali or alkaline earth base is used than is necessary to neutralize the acid formed, the lignin may be attacked, thereby decreasing the amount of binder available in the molding compound. Ammonia also is a convenient alkali which may be added to the cook to neutralize the acetic acid liberated.

After the cooking operation is completed the cooked product is washed with water to remove substantially all of the parts rendered water-soluble. The washing preferably is continued until the hydrogen ion concentration of the residue is such that its pH value is 5.5 to 7.0 as measured with the Truog soil indicator. In case of a low pH or prolonged time of molding, it is desirable to incorporate a buffer in the molding powder. The wet pulp, which is dark brown in color, is then dried. The dried product, called the primary material is disintegrated in a mill to a powder which should pass through at least a 40-mesh screen and preferably a finer screen. The 65-mesh material gives excellent results. Thus, when powdered it is in a form for use as a molding compound either alone or in combination with, for example, other organic materials. The primary material thus made consists of a filler and a binder. The filler is largely the unchanged cellulose of the lignocellulosic raw material. The binder is primarily the substance resulting from the action of water on the lignin during the cooking operation. Other fillers and binders may be added to the primary material.

This molding-powder is plastic and is well suited to molding operations. A small amount of moisture present in the powder is advantageous since the powder is rendered more plastic and the moisture resistance is increased as hereinbefore explained. The amount of moisture may vary from 0.5% to 10%. About 5% gives excellent results. The primary product may be molded at a pressure of 1600 to 5000 pounds per square inch, a pressure of 3000 pounds being a favorable one, while it is maintained at an elevated temperature, usually above 100° C. A favorable temperature is 185° C., though temperatures of over 200° C. may be used. The molding time should be sufficient to produce the desired hard and resinous properties, 2 to 15 minutes usually sufficing for small objects. The material is preferably molded by giving it a preliminary cold press in the mold at high pressure, 6000 to 7000 pounds per square inch, and then dropping the pressure. The mold is then heated. As the product heats the pressure again rises. After being subjected to the desired pressure as hereinbefore specified for the necessary time, the mold may be cooled while maintaining some pressure. Hot or cold ejection is used.

The resultant product is hard, has a resinous appearance, remains thermoplastic and has many of the properties of products made by molding mixtures of a resin such as Bakelite and a filler such as wood flour. The moisture absorption is very low, for example, less than 2% when a 2 inch disc which is ¾ inch thick is immersed in water for 18 hours. The modulus of rupture varies with the different materials. In a specific example it was 7000 pounds per square inch when molded with a small amount of water and 8400 pounds per square inch when molded dry. The density varied from 1.40 to 1.45. The best results are obtained if the hydrogen ion concentration of the primary product is controlled during molding by the addition of a buffer such as sodium acetate.

A small amount of zinc stearate, for example, 1%, may be mixed with the molding-powder to secure better release in the mold. The zinc stearate acts as a lubricant and also aids the water resistance. Phenols or aromatic amines may be incorporated with the primary product before molding, to increase the water resistance, plasticity and strength of the molded product. A mixture of a phenol and an aromatic amine appears to be more desirable than an equal amount of either one alone since the plasticity and strength are increased. Phenols which may be used are phenol, nitrophenol, o-, m-, and p-cresol, alpha- and beta-napthol, catechol, pyrogallol, and p-aminophenol. Aromatic amines, which may be used are aniline, o-, m-, and p-toluidine, alpha- and beta-napthylamine, p-toluolsulphonamide, phenyl ureas, phenyl guanidine. The amount of these phenols and aromatic amines which may be used varies over a wide range, usually about 1% to 10% of the weight of the primary product being desirable.

The primary product also is exceedingly useful as a filler to replace wood-flour and similar materials in the molding of plastics in which a resin is added in substantial amounts, i. e. 20% to 80%. It is much more water-resistant than wood-flour and blends better with the resin, which may be either artificial or natural. The resultant molded product has improved water-resistance over that containing ordinary wood-flour. The natural resins may be rosin and/or its salts and esters (ester gum), copal, shellac, sandarac, and damar. The artificial resins may be of the following types: phenol-formaldehyde, urea-formaldehyde, phthalic anhydride-glycerol (glyptals), cumarone, vinyl resins, cellulose nitrate, cellulose acetate, benzyl cellulose.

Following are specific examples which illustrate practical embodiments of our process so that those skilled in the art may practice it. The time of molding given is for articles about 0.10 to 0.20 inch thick. The invention is not limited to these specific examples.

(1) One part of maple sawdust is cooked with one part of water in an autoclave at a temperature of 193° C. (steam pressure of 180 pounds per square inch gauge) for one hour, the pH of the cook being kept at about 5.5 by the addition to the above mixture of 2½% (of the weight of the air dry sawdust) of calcium hydroxide. The cooked material is filtered in a filter press and washed with water until the pH is about 5.5 to 7.0. After the water solubles are substantially entirely removed the filter cake is dried at 110° C. The dried material is divided into three parts after disintegrating to a 100-mesh powder in a mill. (a) The first part is mixed with about 5% of water and 1% zinc stearate, introduced into a cold mold and pressed at 7000 pounds per square inch. The pressure is then dropped to about zero and the mold is then heated to 185° C. The pressure in the mold is permitted to build up as a result of the temperature rise to 3000 pounds per square inch for 10 minutes. Cold ejection is used. (b) To the second portion of powdered primary product 2.0% by weight of a mixture of equal parts of phenol and aniline is added and incorporated thoroughly therewith. This mixture is hot-molded for 10 minutes at a pressure of 5000 pounds per square inch and at a temperature of 185° C. (c) The third portion of powdered primary product is mixed with 6% of water and ½% zinc stearate, introduced into a cold mold and prepressed at 6000 pounds per square inch. The pressure is dropped to 5000 pounds per square inch and the mold heated to 170° C. for 10 minutes at this pressure after which it is cooled and the product ejected.

(2) One part of disintegrated corncobs is cooked with one part of water at a temperature of 188° C. (160 pounds gauge pressure) for one hour in the presence of 5% sodium acetate as a buffer. The material is washed with water to a pH of 5.0 to 6.0 and after substantially all of the water-solubles are removed, is filtered and then dried to 5% moisture. After being disintegrated to pass through a 65-mesh screen it is molded for 10 minutes at a temperature of 185° C. and at a pressure of 5000 pounds per square inch.

The pH as specified in each instance is that which is obtained with the Truog soil tester.

This application is a continuation in part of our co-pending application Serial No. 134,272, filed April 1, 1937, now Patent No. 2,196,277 issued April 9, 1940.

We claim:

1. In the process for producing a thermoplastic, moldable product having high water resistance from a subdivided natural lignocellulosic material in which said material is cooked with water at a temperature of approximately 188° C. to 225° C. for a period of approximately 5 minutes to 1 hour to dissolve a part of the hemicelluloses and render the lignocellulosic material thermoplastic, the water containing an alkaline substance in an amount sufficient to produce a pH of approximately 4.0 to 6.0 in the cooked mass at the end of the cook, leaching the cooked material with water until substantially all the water solubles are removed and drying the leached material, the step which comprises mixing with the dried material approximately 1 to 10 percent by weight of a phenol.

2. The method of claim 1 in which the added material is phenol.

3. A comminuted material plastic during hot molding operations comprising a mixture of a treated lignocellulosic material and approximately 1 to 10 percent, based on the weight of the treated lignocellulosic material, of a phenol, said material being the product resulting from cooking a natural lignocellulosic material with water at a temperature of approximately 188° C. to 225° C. for approximately 5 minutes to 1 hour in the presence of an alkaline substance sufficient in amount to produce a pH of approximately 4.0 to 6.0 in the cooked mass at the end of the cook to render a part of the natural lignocellulosic material water soluble, and washing the cooked material to remove said water solubles 4. The product of claim 3 to which finely divided zinc stearate has been added as a lubricant.

5. The product of claim 3 in which the treated comminuted lignocellulosic material has been dried to a small moisture content.

6. A hard, resinous product comprising a heat and pressure molded mixture of a comminuted thermoplastic treated natural lignocellulosic material and approximately 1 to 10 percent, based on the weight of the treated lignocellulosic material, of a phenol, said treated lignocellulosic material being substantially free of the water solubles contained in a natural lignocellulosic material after being cooked with water at a temperature of approximately 188° C. to 225° C. for approximately 5 minutes to 1 hour in the presence of an alkaline substance sufficient in amount to produce a pH of approximately 4.0 to 6.0 in the cooked mass at the end of the cook.

ARLIE W. SCHORGER.
JOHN H. FERGUSON.